United States Patent [19]

Vajdovich et al.

[11] 4,430,512
[45] Feb. 7, 1984

[54] PROCESS AND EQUIPMENT FOR THE UTILIZATION OF THERMAL ENERGY OF WASTE HAVING BEEN SUBJECTED TO OIL CONTAMINATION

[75] Inventors: György Vajdovich; István Csorba, both of Budapest, Hungary

[73] Assignee: Csöszerelöipari Vállalat, Budapest, Hungary

[21] Appl. No.: 320,964

[22] PCT Filed: Mar. 11, 1981

[86] PCT No.: PCT/HU81/00010
§ 371 Date: Nov. 2, 1981
§ 102(e) Date: Nov. 2, 1981

[87] PCT Pub. No.: WO81/02618
PCT Pub. Date: Sep. 17, 1981

[30] Foreign Application Priority Data

Mar. 11, 1980 [HU] Hungary .................. 567/80

[51] Int. Cl.³ .................................................. B01D 17/00
[52] U.S. Cl. .................................. 210/745; 210/805; 210/806; 210/96.1; 210/195.1
[58] Field of Search ............... 210/739, 745, 805, 806, 210/96.1, 195.1, 196

[56] References Cited

U.S. PATENT DOCUMENTS

| | | | |
|---|---|---|---|
| 1,481,901 | 1/1924 | Hapgood | 210/96.1 X |
| 3,005,554 | 10/1961 | Kuntz | 210/96.1 |
| 3,215,126 | 11/1965 | Sprague | 122/451 |
| 3,253,711 | 5/1966 | Young | 210/745 |
| 3,937,662 | 2/1976 | Bartik | 210/745 X |
| 3,966,603 | 6/1976 | Grant | 210/739 X |
| 4,064,893 | 12/1977 | Pitt | 210/739 X |
| 4,162,973 | 7/1979 | Lynch | 210/806 X |
| 4,315,822 | 2/1982 | Jaisinghani | 210/805 X |

FOREIGN PATENT DOCUMENTS

761617 11/1956 United Kingdom .

*Primary Examiner*—Robert H. Spitzer
*Attorney, Agent, or Firm*—Gabriel P. Katona

[57] ABSTRACT

A process and apparatus for recovering the heat content of oil-contaminated waste water wherein the waste water is collected and is conducted through a plurality of waste water carrying ducts with shut-off valves, from an oil manipulating system into a single duct with a shut-off valve; a duct with two branches attached to and leading from said shut-off valve; each branch of said branched duct having therein a magnet valve which operates contrarily to the magnet valve in the other branch; each of said magnet valves connected by means of a cable to an instrument which senses the oil content of the waste water, wherein if the instrument does not sense oil, one magnet valve is open and the other is closed, and if the instrument senses oil, the other magnet valve is open and the one magnet valve is closed; a pressurized sample collector connected via a duct to the one magnet valve intermediate said valve and said sensing instrument; said pressurized collector having therein a sampling place on a float connected by a duct to a sampling vessel which is intermediate said pressurized collector and said sensing instrument; a duct for carrying the waste water from the collector is connected to a shut-off means and a pump which is connected to and controlled by a sensing instrument, transporting the uncontaminated waste water through a check valve for further utilization; and carrying the contaminated waste water through a duct leading from the other magnet valve to an external repository.

3 Claims, 2 Drawing Figures

PROCESS AND EQUIPMENT FOR THE UTILIZATION OF THERMAL ENERGY OF WASTE HAVING BEEN SUBJECTED TO OIL CONTAMINATION

BACKGROUND

The invention relates to a process and apparatus for the reclamation and repeated use of waste water which previously had been subjected to oil contamination.

In systems manipulating different heavy oils (e.g. heating oil, residual asphalt and the like) waster water from the steam which previously was used for, respectively, racking-off the oil, storage, transport, warming and heating of the oil, in order to protect the boiler was led together with leaking oil into the purifying system for purifying the oil-contaminated waste water after the oil is separated it is recirculated into the storage space, while the waste water, being properly cleared in accordance with prevailing technical circumstances but still containing a certain quantity of oil contamination and accordingly, not being suitable for the use as feedwater for the boiler, is discharged into an above-ground recipient (e.g. a brook, a river and the like). In such a manner the heat content of the waste water which is at a temperature of about 150° C. is completely lost. Instead of using the discharged waste water as a feedwater for the boiler softened water is used increasing costs, because considerable energy consumption is required to soften and heat it. By observing the relevant specifications and standards certain procedures are possible to follow for the recirculation of the waste water arising, in particular, during the basic heating of tanks, in the course of pre-heating the exhaust heat-exchanger of the tanks, or the accompanying heating of other apparatus. The minor part of the waste water results from heating the filters and oil-heating heat-exchangers. However, recirculation of this type of waste water is not permitted by the relevant standards. The pre-requisite of the repeated use of the waste water of oil-manipulating systems is, that under no circumstances can water with oil surpassing the level prescribed in the standard be recirculated into the boiler or any other similar equipment.

Accordingly, the object of the invention is to develop a process and an apparatus which enables the repeated use of the waste water from oil manipulating systems in such a manner that the admission of the oil-contaminated waste water into the feedwater of the heating system is prevented in a reliable manner, and simultaneously the waste water which is suitable for further use is led to the place of utilization.

SUMMARY OF THE INVENTION

In accordance with this invention, the aim set is the waste water of the oil manipulating system is collected. The quality of the waste water is automatically and continuously controlled and, depending on the results of the control, the waste water is either led to the place of utilization or via a purifying plant it is discharged into an above-ground recipient.

The process according to the invention uses an apparatus which is provided with a forked collecting duct. Each branch of the forked duct is provided with oppositely operating magnet valves. The clean waste water is fed into each duct past the magnet valve therein to a closed pressurized collector in connection with an instrument sensing the oil content. At the same time the instrument sensing the oil content remains in connection with the contrarily operating magnet valves, as well as with a pump installed past the collector which pumps the clean waste water to the place of utilization.

The instrument controlling the oil quality may be operated by the flow or sampling principle. A preferred embodiment of the invention is arranged in a container which can be heated through the connection of vapour steam, enabling operation in winter time and outdoor.

Expediently the instrument controlling the oil quantity in the apparatus is connected via a remote transmitting signalling system to the dispatcher-room.

The advantages of the system are, as follows:

by utilizing the thermal energy of waste water considerable energy savings, including a large quantity of heating oil, becomes possible;

by installing the apparatus according to the invention the amount of the cleaned water to be discharged into the above-ground recipient may be considerably reduced, resulting partly in reduced investment costs at the treatment plant which purifies the sewage having oil therein. This is ecologically advantageous since less oil contamination is discharged into the surfacial waters;

in addition to these, by using the process and apparatus according to the invention, the requirement of raw water and softened water becomes less, resulting in reduced investment costs.

The apparatus according to the invention is absolutely reliable, the operation is ensured in case of voltage drop-out or failure of the instrument. It can be installed into an inner space or outdoors, either into an already existing system or a new one, with a minimal expenditure of assembly work.

BRIEF DESCRIPTION OF THE DRAWINGS

The invention will be described in detail by means of a non-limiting preferred embodiment, by the aid of the accompanying drawings, wherein.

DETAILED DESCRIPTION OF THE INVENTION

Figure 1:
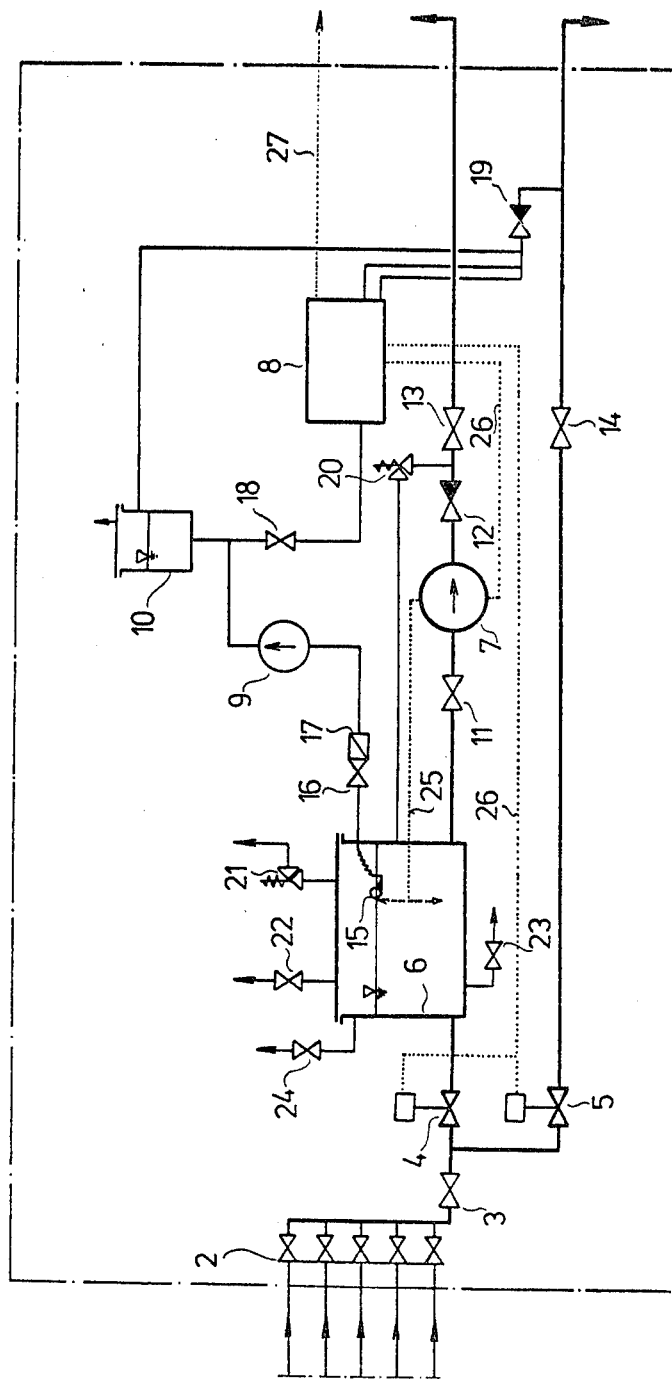
FIG. 1 is a schematic representation of the apparatus according to the invention and FIG. 2 illustrates the arrangement of the apparatus according to the invention in a heavy-oil manipulating system.

FIG. 1 shows the apparatus according to the invention which serves to control the oil content of the waste water and to control the transport thereof—indicated by and referred to furtheron as apparatus 1.

Into the collecting duct of the apparatus 1 several ducts discharge the waste water which was subjected to oil contamination. The ducts can be individually closed by means of the shut-off means 2. Into the collecting duct collecting the waste water to be controlled, the main shut-off means 3 is installed, past which the collecting duct if forked. One branch of the forked duct is provided with one magnet valve 4, while the other branch has a second magnet valve 5. Both of the magnet valves 4 and 5 are connected via a cable 26 to an instrument 8, known in itself, which controls the oil content. The magnet valves 4 and 5 are contrarily operating. The one magnet valve 4 is open when the instrument 8 does not sense any oil contamination in the waste water and it is closed, when the instrument 8 senses the oil.

The pulses arriving from the instrument 8 activate the second magnet valve 5 in the opposite sense as valve 4. A pressurized collector 6 is arranged into the duct of the magnet valve 4, past the valve 4. The pressurized collector 6 is provided with a safety valve 21, a deaeration valve 22, a discharge valve 23 and a connection 24 for the vapour-steam. In the collector 6 there is a flexibly connected sampling place 15 installed on a float and provided with an open sampling vessel 10; the sampling place 15 is connected to the instrument 8 sensing the oil content. Into the duct interconnecting the collector 6 and the sampling vessel 10 are a sampling pump 9, a shut-off means 16 and a filter 17. A shut-off means 18 is installed in the duct interconnecting the sampling vessel 10 and the instrument 8. Installed into the duct transporting the waste water of controlled and proper quality from the collector 6, are the pump 7, the check-valve 12, as well as the shut-off means 11 (for the suction side of the pump 7) and the shut-off means 13 (for the pressure side of the pump 7). Between the check valve 12 and the shut-off means 13 safety-valve 20 also connected to the collector 6 is installed. The pump 7 is connected to the instrument 8 sensing the oil by means of cable 26, while a cable 25 interconnects the pump 7 with a two-way, automatically controlling level-switch with float.

The duct containing the magnet valve 5 and a main shut-off means 14 conveys the oil-contaminatd waste water which is unsuitable for recirculation.

The instrument 8 sensing the oil is connected via a cable 27 to a continuously supervised dispatcher-room. The apparatus according to the invention operates, as follows:

Normally the waste water is not contaminated under normal operational circumstances and is well suited for repeated use. However, when it is contaminated by oil it is cleaned as follows: It is conducted through the magnet valve 4 into the collector 6. From there it is pumped by the sampling pump 9 through the sampling place into the sampling vessel 10, where the sample, and thus the quality of the arriving waste water is continuously controlled by the instrument 8 sensing the oil content. Meanwhile, the magnet valve 5, operating contrarily to the magnet valve 4, keeps the duct carrying the contaminated waste water in a closed state, while the pump 7 which is controlled by the level switch with a float, in the duct pumps the cleaned waste water to the place of utilization from the collector 6.

If the oil content surpasses the permissible value, the instrument 8 forwards the pulse through the cable 26 to the magnet valves 4, 5 as well as to the pump 7. Then the magnet valve 4 closes, the pump 7 stops, and at the same time the magnet valve 5 opens and the waste water contamined with oil is led to a above-ground recipient. In case of a voltage drop-out or failure of the instrument 8 the waste water contamined with oil cannot flow back into the boiler, whatever circumstances are prevailing. After having detected and repaired the defect resulting in oil contamination and removed the oil penetrated into the collector 6, the equipment is put manually into operation. Then, the magnet valve 4 repeatedly opens, the magnet valve 5 closes and simultaneously the pump 7 starts allowing, the waste water to stream through said duct as the instrument 8 senses the oil contamination.

Figure 2:
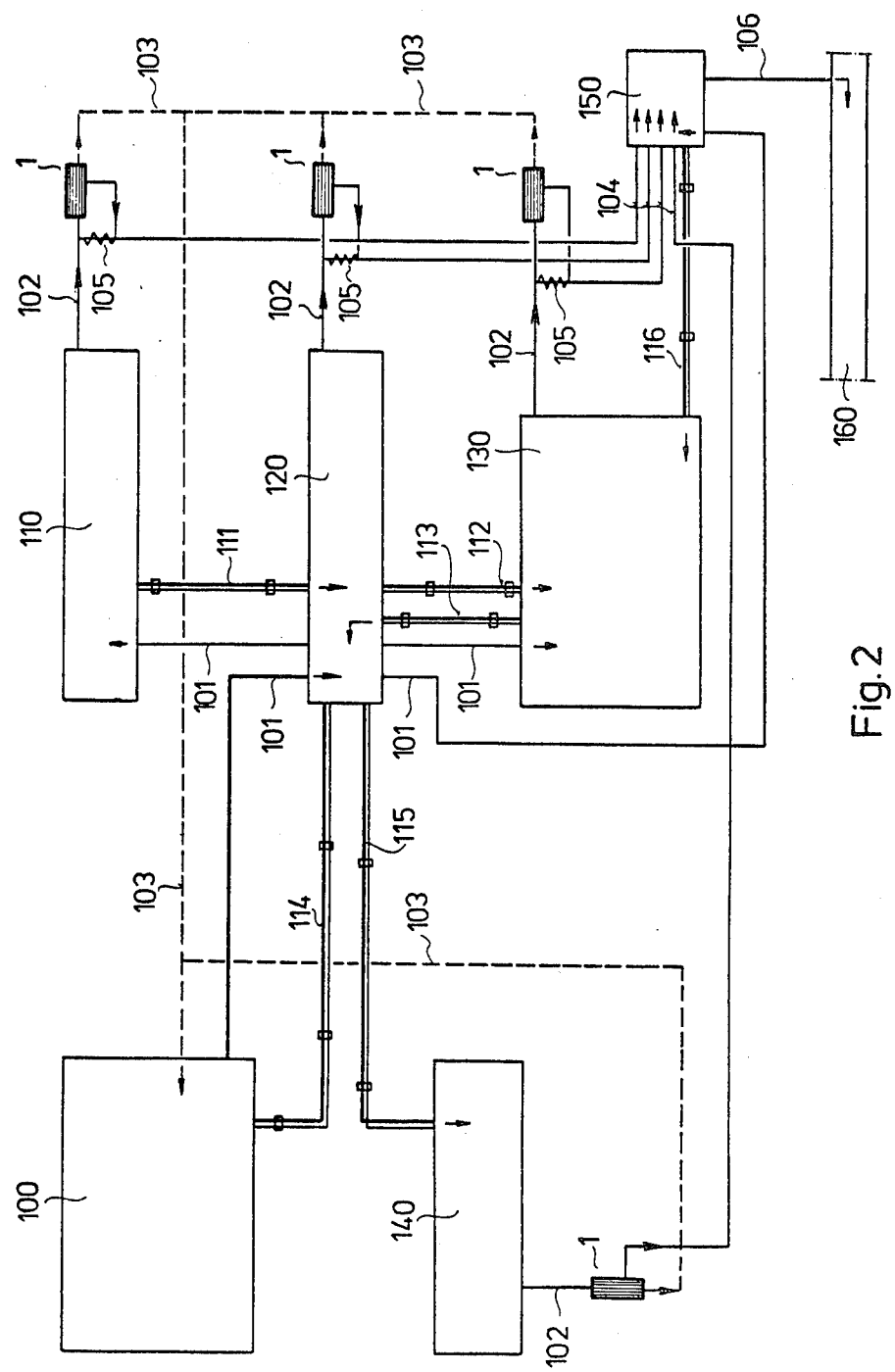

In FIG. 2 the arrangement and expedient way of installation of the apparatus 1 e.. in an oil-manipulating system is illustrated. Said oil manipulating system consists of the thermal energy source 100 (being in general a boiler house supplying the steam to the entire oil-manipulating system), the oil-racking station 110 (for railway, tow barge or vehicular traffic), the pump house 120, the oil storage space 130, the fuel consuming unit 140 of technological character (e.g. a clinker furnace of a cement plant), the purifying system 150 and the above-ground recipient 160. The thermal energy source 100 ensures by means of the steam conduit 101 pumping, respectively, applicapility of the easily solidifying oil in the oil-racking station 110, the pump house 120 and the oil storage space 130. From all the units, and also from the fuel consuming unit 140, the conduits 102 which forward the waste water which is contamined with oil are branched-off and each branch incorporates an apparatus 1. The ducts 103 of the apparatus 1, indicated with the discontinuous line in the figure, are connected to the thermal energy source 100, to which the clean waste water free of oil in recirculated. The other discharge ends of the apparatuses 1 are connected via the duct 104 to the purifying unit 150, which collects the leaking, discharged and blown out oil, as well as the waste water which was contaminated with oil and forwards the clean water (being unsuitable for the repeated use in the boiler) via the duct 106 to the above-ground recipient e.g. (a brook, a river, a lake, or other similar repository). At the same time the oil which was collected and cleaned in the purifying system 150 is led through the charging conduit 116 to the oil storage space 130. The oil-racking station 110 and the pump house 120 are interconnected by means of an oil duct 111 which is provided with accompanying heating; the charging conduit 112 interconnects the pump house 120 and the oil storage space 130, the exhaust duct 113 and the oil supply conduits 114, 115 are formed in the same manner. In FIG. 2 the position number 105 indicates the waste water sections to be liquidated after the installation of the equipment according to the invention.

What we claim:

1. A process for recovering the heat content of oil-contaminated waste water, which comprises collecting the waste water and conducting it through a plurality of waste water carrying ducts with shut-off valves, from an oil manipulating system into a single duct with a shut-off valve; a duct with two branches attached to and leading from said shut-off valve; each branch of said branched duct having therein a magnet valve which operates contrarily to the magnet valve in the other branch; each of said magnet valves connected by means of a cable to an instrument which senses the oil content of the waste water, wherein if the instrument does not sense oil, one magnet valve is open and the other is closed, and if the instrument senses oil, the other magnet valve is open and the one magnet valve is closed; a pressurized sample collector connected via a duct to the one magnet valve intermediate said valve and said sensing instrument; said pressurized collector having therein a sampling place on a float connected by a duct to a sampling vessel which is intermediate said pressurized collector and said sensing instrument; a duct for carrying the waste water from the collector is connected to a shut-off means and a pump which is connected to and controlled by a sensing instrument, transporting the uncontaminated waste water through a check valve for further utilization; and carrying the contaminated waste water through a duct leading from the other magnet valve to an external repository.

2. Apparatus for the utilization of the thermal energy of hot waste water from oil manipulating systems comprising a plurality of waste water carrying ducts with shut-off valves leading from an oil manipulating system into a single duct with a shut-off valve; a duct with two branches attached to and leading from said shut-off valve; each branch of said branched duct having therein a magnet valve which operates contrarily to the magnet valve in the other branch; each of said magnet valves connected by means of a cable to an instrument which senses the oil content of the waste water, wherein if the instrument does not sense oil, one magnet valve is open and the other is closed, and if the instrument senses oil, the other magnet valve is open and the one magnet valve is closed; a pressurized sample collector connected via a duct to the one magnet valve intermediate said valve and said sensing instrument; said pressurized collector having therein a sampling place on a float connected by a duct to a sempling vessel which is intermediate said pressurized collector and said sensing instrument; a duct for carrying the waste water from the collector is connected to a shut-off means and a pump which is connected to and controlled by the sensing instrument for transporting the uncontaminated waste water through a check valve and a duct for further utilization; a duct leading from the other magnet valve for carrying contaminated waste water to en external repository.

3. The apparatus of claim 2 wherein said sample collector has provided thereon a safety valve, a deaeration valve, a discharge valve and a vapor-steam connection which heats the apparatus to adapt it to use in winter.

* * * * *